UNITED STATES PATENT OFFICE.

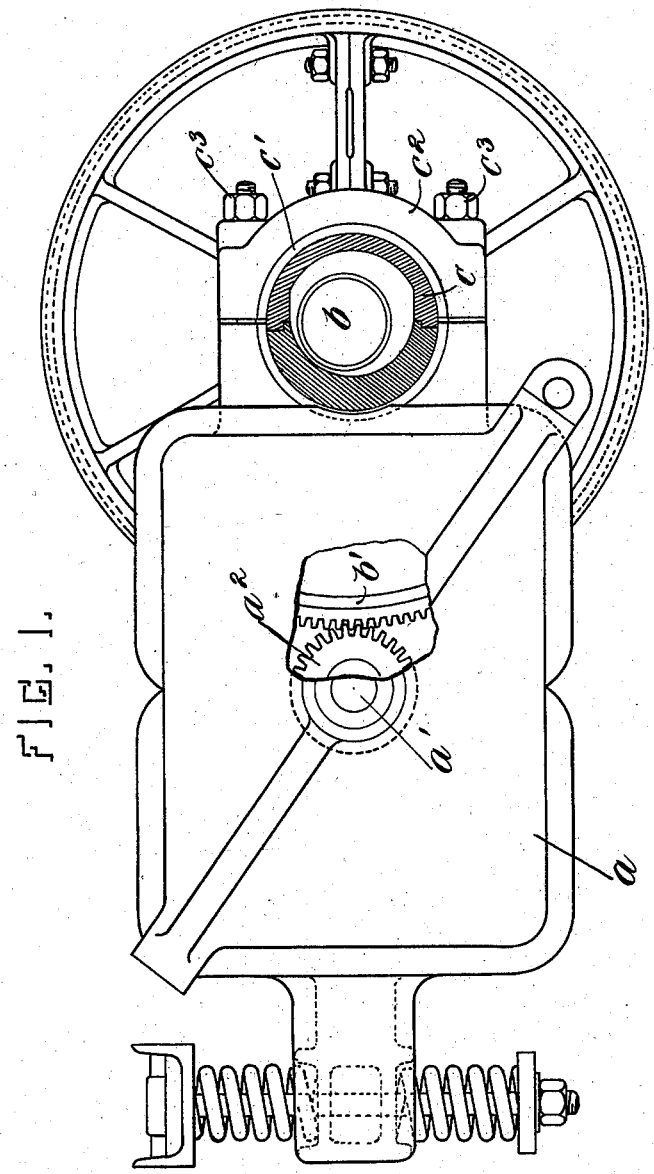

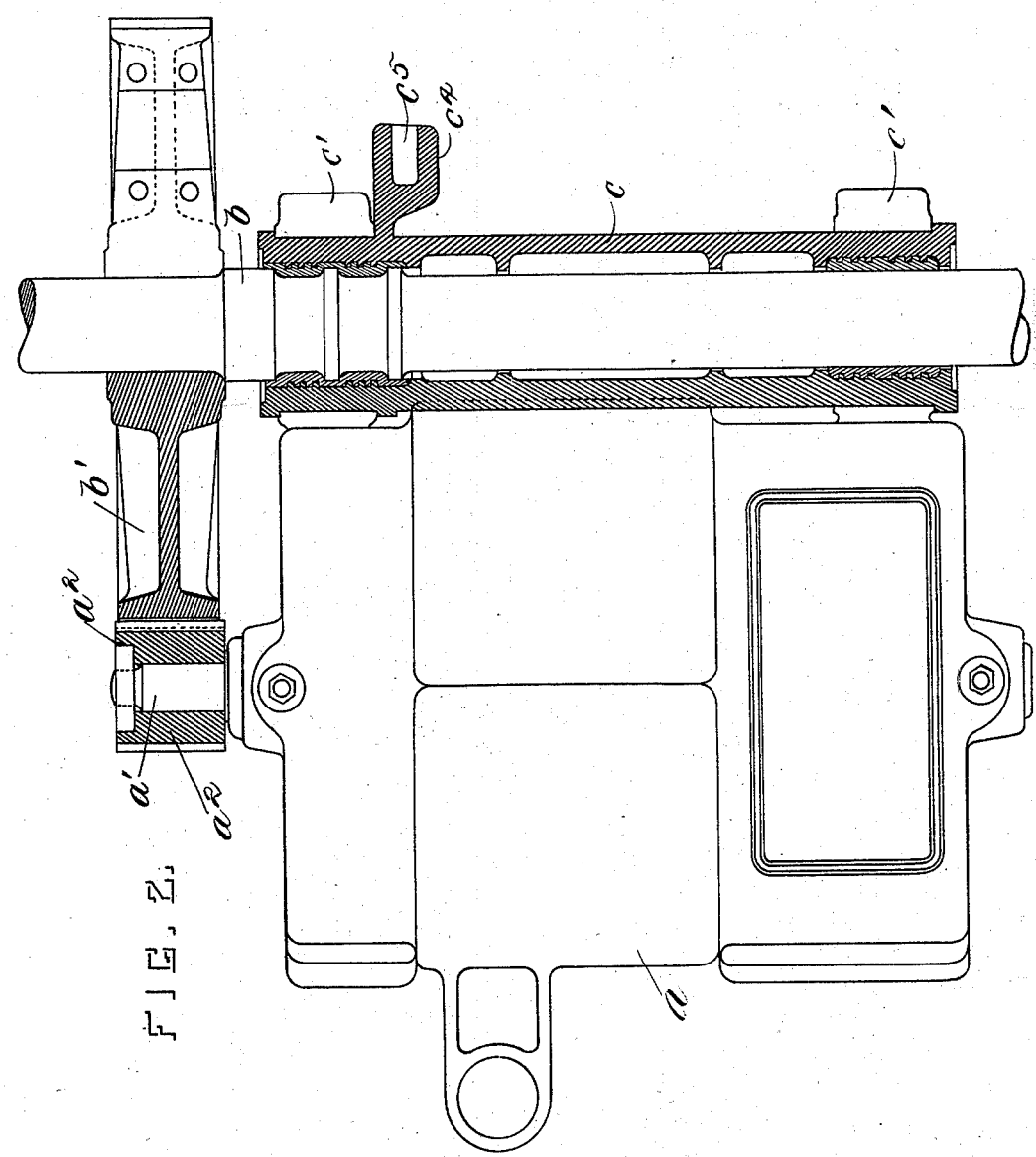

ERNST WILHELM GUSTAV CARL HOFFMANN, OF CHARLOTTENBURG, GERMANY, ASSIGNOR TO THE SIEMENS & HALSKE ELECTRIC COMPANY OF AMERICA, OF CHICAGO, ILLINOIS.

ECCENTRIC MOUNTING FOR ELECTRIC-VEHICLE AXLES.

SPECIFICATION forming part of Letters Patent No. 558,953, dated April 28, 1896.

Application filed December 27, 1895. Serial No. 573,522. (No model.)

*To all whom it may concern:*

Be it known that I, ERNST WILHELM GUSTAV CARL HOFFMANN, a subject of the Emperor of Germany, residing at Charlottenburg, near Berlin, Germany, have invented new and useful Improvements in Eccentric Mountings for Electric-Vehicle Axles, (Case No. 60,) of which the following is a specification.

My invention relates to an eccentric mounting for electric-vehicle axles, the object being to arrange the car-axles in their bearings so that the gear-wheel which is attached to the axle may mesh perfectly and noiselessly with the gear or pinion mounted upon the motor-shaft.

In electric vehicles it is desirable to employ a motor whose armature rotates at a high speed as compared to the rotation of the car-axle, and the armature-shaft is geared with the car-axle through the agency of intermeshing toothed gear-wheels. A difficulty encountered in the employment of gear-wheels in this connection is that the teeth rapidly wear away and the running of the cars causes considerable noise, due to the excessive backlash between the teeth. It is the object of the present invention to overcome this objection, and in accordance therewith the motor frame or casing is provided with journal-boxes at one end, in which a rotatable sleeve is mounted, the journal-boxes being provided with caps adapted to be screwed down to clamp the sleeve immovably in any rotated position into which it may be moved. The car-axle is journaled to rotate within the sleeve and is mounted eccentrically therein, the car-axle carrying a gear-wheel meshing with a pinion mounted on the armature-shaft, which is journaled in bearings provided on the motor-frame or casing. When the teeth of the gear-wheels wear away and the backlash becomes excessive the caps of the journal-boxes may be unclamped and a lever inserted in a socket provided upon the sleeve to rotate the same and adjust the distance between the gear-wheels, after which the sleeve may be again clamped in position.

Referring to the accompanying drawings, Figure 1 is a view in elevation of a motor connected with the car-axle in accordance with my invention. Fig. 2 is a plan view, partly in section, of a motor and car-axle embodying my invention.

Like letters refer to like parts in both figures.

The motor is shown as situated in a casing $a$, the armature-shaft $a'$ extending from the casing and carrying a pinion or gear wheel $a^2$, adapted to mesh with a gear-wheel $b'$, mounted upon the car-axle $b$. The car-axle $b$ carries the wheels of the vehicle and rotates in bearings provided upon the vehicle, the bearings and wheels being omitted in the drawings. The axle $b$ is mounted eccentrically in the bearing-sleeve $c$, which in turn is mounted in journal-boxes $c'$ $c'$. Caps $c^2$ are provided for the journal-boxes, adapted to clamp the bearing-sleeve $c$ in any rotated position to which it may be moved, the caps being held in position by bolts $c^3$ $c^3$. Upon the bearing-sleeve is provided an arm $c^4$, carrying a socket $c^5$ for the insertion of a lever or bar, whereby the bearing-sleeve $c$ may be axially rotated to bring the axle bodily toward or from the armature-shaft, whereby the teeth upon the gear-wheels $a^2$ and $b'$ may be caused to mesh properly. In the drawings, the gear-wheels $a^2$ and $b'$ are illustrated as meshing, and if the bearing-sleeve $c$ be turned in clockwise direction, Fig. 1, the gear-wheels will be moved apart, while the turning of the sleeve in the opposite direction would move the gear-wheel $b'$ toward the gear-wheel $a^2$. The eccentricity between the axis of the shaft $b$ and the axis of the bearing-sleeve $c$ may be very small, and in consequence comparatively small power will be required for the rotation of the sleeve.

Having described my invention, what I claim as new, and desire to secure by Letters Patent, is—

In an eccentric mounting for vehicles, the combination with the motor frame or casing $a$, of the motor-shaft $a'$ journaled to rotate in boxes provided upon said frame, a pinion $a^2$ mounted upon one end of said armature-shaft, a gear-wheel $b'$ meshing with said pinion, a shaft $b$ upon which said gear-wheel is mounted, a rotatable sleeve $c$ within which said shaft $b$ is eccentrically journaled, a laterally-projecting lug $c^4$ provided upon said sleeve $c$ and carrying a socket $c^5$ to facilitate the rotation of said sleeve $c$ and clamps carried upon said frame for clamping the sleeve $c$ in any rotated position to which the same may be moved, substantially as and for the purpose described.

In testimony whereof I affix my signature in the presence of two witnesses.

ERNST WILHELM GUSTAV CARL HOFFMANN.

Witnesses:
    HERMANN RÖNNE,
    OSCAR BIELEFELD.